(12) United States Patent
Davidson

(10) Patent No.: US 6,481,086 B1
(45) Date of Patent: Nov. 19, 2002

(54) METHOD FOR SEALINGLY INTERCONNECTING A PIPE WITH A STRUCTURE SUCH THAT THE PIPE IS AXIALLY MOVABLE WITH RESPECT THERETO

(75) Inventor: Paul Davidson, Macclesfield (GB)

(73) Assignee: Oystertec plc, Manchester (GB)

( * ) Notice: Subject to any disclaimer, the term of this patent is extended or adjusted under 35 U.S.C. 154(b) by 0 days.

(21) Appl. No.: 09/554,712
(22) PCT Filed: Nov. 18, 1998
(86) PCT No.: PCT/GB98/03437
§ 371 (c)(1), (2), (4) Date: Oct. 11, 2000
(87) PCT Pub. No.: WO99/26005
PCT Pub. Date: May 27, 1999

(30) Foreign Application Priority Data

Nov. 18, 1997 (GB) .............................................. 9724221
Feb. 2, 1998 (GB) .............................................. 9802001
Jun. 11, 1998 (GB) .............................................. 9812551

(51) Int. Cl.[7] .............................................. B23P 11/00
(52) U.S. Cl. ..................... 29/436; 29/456; 285/143.1
(58) Field of Search ..................... 285/139.2, 143.1; 29/434, 436, 456

(56) References Cited

U.S. PATENT DOCUMENTS

| 1,125,063 A | * | 1/1915 | Colberg |
| 3,181,899 A | * | 5/1965 | McKnight, Jr. |
| 3,248,135 A | * | 4/1966 | Meripol |
| 3,837,689 A | * | 9/1974 | Csatlos |
| 4,621,841 A | * | 11/1986 | Wakefield |
| 5,509,697 A | * | 4/1996 | Phillips et al. |
| 5,516,157 A | * | 5/1996 | Williamson |
| 5,979,946 A | * | 11/1999 | Petersen et al. |

FOREIGN PATENT DOCUMENTS

| DE | 2025034 | * | 11/1971 |
| EP | 039476 |   | 4/1985 |
| GB | 2165016 A | * | 4/1986 |
| GB | 2314392 A | * | 12/1997 |

* cited by examiner

Primary Examiner—David P. Bryant
(74) Attorney, Agent, or Firm—Myers Bigel Sibley & Sajovec

(57) ABSTRACT

A method is provided for interconnecting an end of a pipe with a hollow structure having a screw-threaded tubular inlet thereto. The method includes applying a one-part annular sealing member around the pipe, wherein the annular sealing member has a screw-threaded portion for engagement with the screw-threaded tubular inlet and is provided with the first and second sealing means; distorting outwardly the end of the pipe around at least a portion of the periphery thereof; and effecting screw-threaded engagement between the annular sealing member and the tubular inlet, such that sealing engagement is effected between the annular sealing member and the pipe end over a plurality of relative axial positions therebetween. The first sealing means effects sealing engagement between the annular sealing member and the inlet, and the second sealing means effects sealing engagement between the annular sealing member and the pipe end. Axial movement of the pipe relative to the annular sealing member is permitted when the annular sealing member is in sealing engagement with the pipe end.

9 Claims, 6 Drawing Sheets

METHOD FOR SEALINGLY INTERCONNECTING A PIPE WITH A STRUCTURE SUCH THAT THE PIPE IS AXIALLY MOVABLE WITH RESPECT THERETO

This invention relates to joints and in particular to joints and hand tools for connecting a pipe or other tubular elements to a hollow structure having a tubular inlet thereto.

Joints of the type with which this invention is concerned have many applications, examples being joints for use in connection with central heating systems, air conditioning systems, vehicles, white goods, petrol pumps, fire fighting equipment, heater batteries, tank fittings and three way valve systems.

Current joints of the type with which this invention is concerned are normally such that they are difficult to install and a major reason for this is that they do not allow relative axial movement between the pipe and the hollow structure to which the pipe is to be connected.

According to the present invention there is provided a method of interconnecting an end of a pipe with a hollow structure having a screw-threaded tubular inlet thereto, the method comprising applying an annular sealing member around the pipe, said annular sealing member having a screw-threaded portion for engagement with the screw-threaded tubular inlet and being provided with first and second sealing means, said first sealing means being for sealing engagement between said annular sealing member and said inlet and said second sealing means being for sealing engagement between said annular sealing member and said pipe end, distorting outwardly the end of the pipe around at least a portion of the periphery thereof, and effecting screw-threaded engagement between the annular sealing member and the tubular inlet, whereby sealing engagement may be effected between said sealing member and said pipe and over a plurality of relative axial positions therebetween.

Accordingly, a joint formed by a method allows relative axial movement between the members to be joined together. Such an arrangement allows easy positioning of the members into their appropriate positions relative to each other and subsequent operation to form an effective joint between the members.

The annular sealing member is a single member provided with means for accommodating the first and second sealing means as well as a screw threaded portion or other means for engaging the tubular inlet. The annular sealing member may also be provided with a recess so as to accommodate a protrusion or crimp or upset of a pipe. The recess is preferably substantially continuous about the periphery of the pipe.

The first and second sealing means may be any suitable sealing elements, for instance, O-rings.

The sealing member and the pipe may be put into sealing engagement with each other over a plurality of discrete relative axial positions or over a continuous range of positions therebetween. Preferably, the pipe is provided with some form of radially and outwardly extending protrusion which limits the range of axial positions due to engagement between said protrusion and another element of the joint, for instance, the annular sealing member.

In another embodiment of the invention the pipes provided with two radially and outwardly extending protrusions. Preferably, the first of said protrusions protrudes a sufficient distance about the periphery of a pipe so as to engage with the joint of the invention and prevent the pipe from being pulled out of engagement with same. More preferably said first protrusion is suitable located a relatively short distance from the end of the pipe. Preferably, the second protrusion is relatively small with respect to the first protrusion, and more preferably still said second protrusion is of marginally smaller dimensions than the recess portion in the annular sealing member. Thus, in use and in position, said second protrusion is accommodated within the recess portion of the annular sealing member and is allowed sufficient movement therein so as not to impede rotational movement of the pipe.

It will be appreciated that provision of two protrusions, the first protrusion acting as a pipe-stop just outside the joint itself, and the second protrusion being loosely accommodated within the joint itself, allows for limited axial movement whilst providing a secure joint.

The invention also provides a joint for use in the method of the invention, the joint being as defined above in connection with said method.

There may also be provided with the joint a tool comprising means for distorting or crimping or flaring the end of a pipe. Ideally the tool is manually operated and the tool may be of a scissors type or a clamping type action. In the scissors type embodiment, the tool comprises pivotally connected upper and lower jaws, wherein the lower jaw has corresponding recesses into which spikes or ribs of the upper jaw fit when the jaws are closed together about at least a part of a pipe. Alternatively the tool comprises a clamp, wherein an upper surface of said clamp is provided with recess portions and a lower surface is provided with corresponding spikes or ridges or the like which fit into the recesses in a clamped position. In use, the pipe is sandwiched between the two clamping surfaces or scissors jaws and sufficient force is applied so as to impart a crimp or ridge or groove onto the pipe surface.

Embodiments of the invention will now be described, by way of examples only, and with reference to the accompanying drawings, in which.

Figures 1, 2:
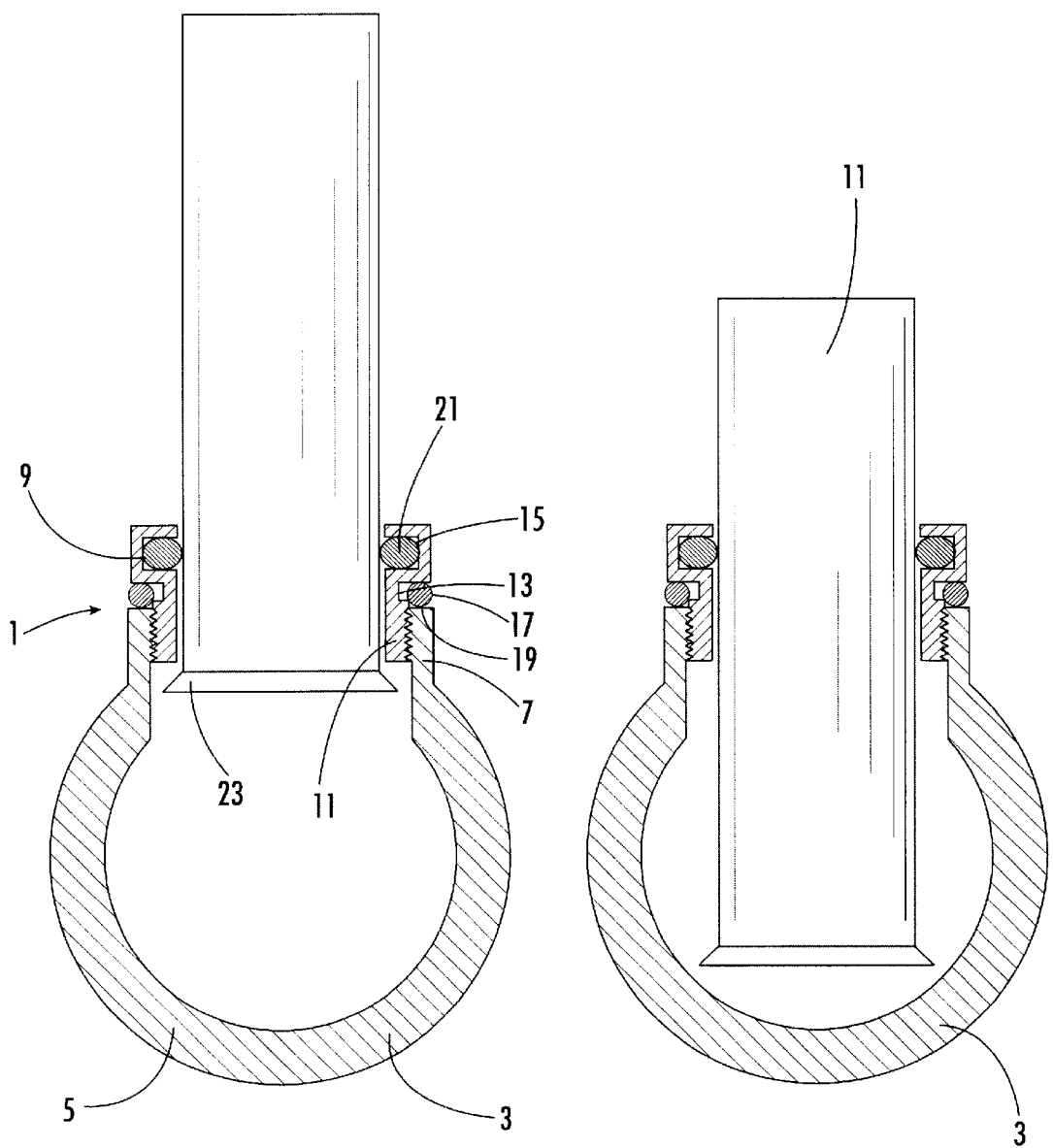
FIG. 1 shows a cross-section through a first embodiment of a joint of the invention.
FIG. 2 shows an embodiment of FIG. 1 but with different relative axial positions between the members of the drawing.

Referring to FIGS. 1 and 2 of the accompanying drawings, a joint 1 lies between a pipe receiving fitting 3 of a central heating radiator and a radiator valve (not shown). Pipe receiving fitting 3 is in the form of a hollow sphere 5 from which a short tubular inlet 7 extends. The fitting 3 is provided with a short length of pipe (not shown) integral therewith and which is welded to the body of the radiator (not shown). Tubular inlet 7 is threaded on its inner surface.

The joint comprises two parts, an annular sealing member 9 and a tubular member 11.

The annular sealing member 9 is in the form of a short tube of which a first portion 11 has a relatively thick tubular wall and is provided with a threaded outer surface which is for engagement with the threaded inner surface of inlet 7 of pipe receiving fitting 3.

Over the rest of its axial length, annual sealing member 9 has a relatively thinner wall which is stepped axially to provide two O-ring accommodating portions 13 and 15.

As seen in FIGS. 1 and 2, O-ring accommodating portion 13 is in the form of an outwardly facing recess which is shaped and dimensioned so as to hold an O-ring 17 and allow it to be compressed against the radial end surface 19 of inlet 7 of fitting 3. This is achieved by the recess 13 being provided with two spaced apart radial walls, the radial wall remote from inlet 7 extending radially outwardly beyond the inner radial wall. As a result the O-ring 17 can be trapped between the outer radial wall and the surface 19, as illustrated in FIGS. 1 and 2.

The second O-ring accommodating portion 15 lies adjacent the first O-ring accommodating portion and is in the form of a recess facing radially inwardly. This recess accommodates a second O-ring 21 which is for sealing engagement between the annular sealing member 9 and the tubular member 11.

Tubular member 11 is provided with a radially outwardly directed end flange 23 which may be formed by deforming the end of a uniform tubular member.

In order to form a secure joint between a pipe having associated therewith tubular member 11 and the pipe receiving fitting 3, the tubular member 11, having the annular sealing member 9 positioned thereabout, is introduced into inlet 7. The outer threaded portion of annular sealing member 7 is brought into engagement with the inner threaded section of inlet 7 and annular sealing member 9 is turned until O-ring 17 is compressed between the annular sealing member and the inlet 7. At this position, O-ring 21 is in firm sealing engagement with tubular member 11.

FIG. 2 illustrates the same joint but with the tubular member 11 shown in a different axial position relative to pipe receiving fitting 3. FIGS. 1 and 2 illustrate the full range of axial positions between member 11 and fitting 3, thereby allowing for ease of fitting of the joint and for the accommodation of different relative positions between the pipe and the radiator to which it is to be connected.

It should be appreciated that the use of the joint such as that described above allows the central heating radiator to be rotated relative to the pipes to which it is connected since fitting 3 may be rotated with annular sealing member 9 about tubular member 11. Accordingly such joints provided between two coaxilly aligned valves of a radiator allow the radiator to be lifted and hingedly lowered to give access to the wall there behind for maintenance and decoration without use of tools or loosening any plumbing connection.

Figure 3:
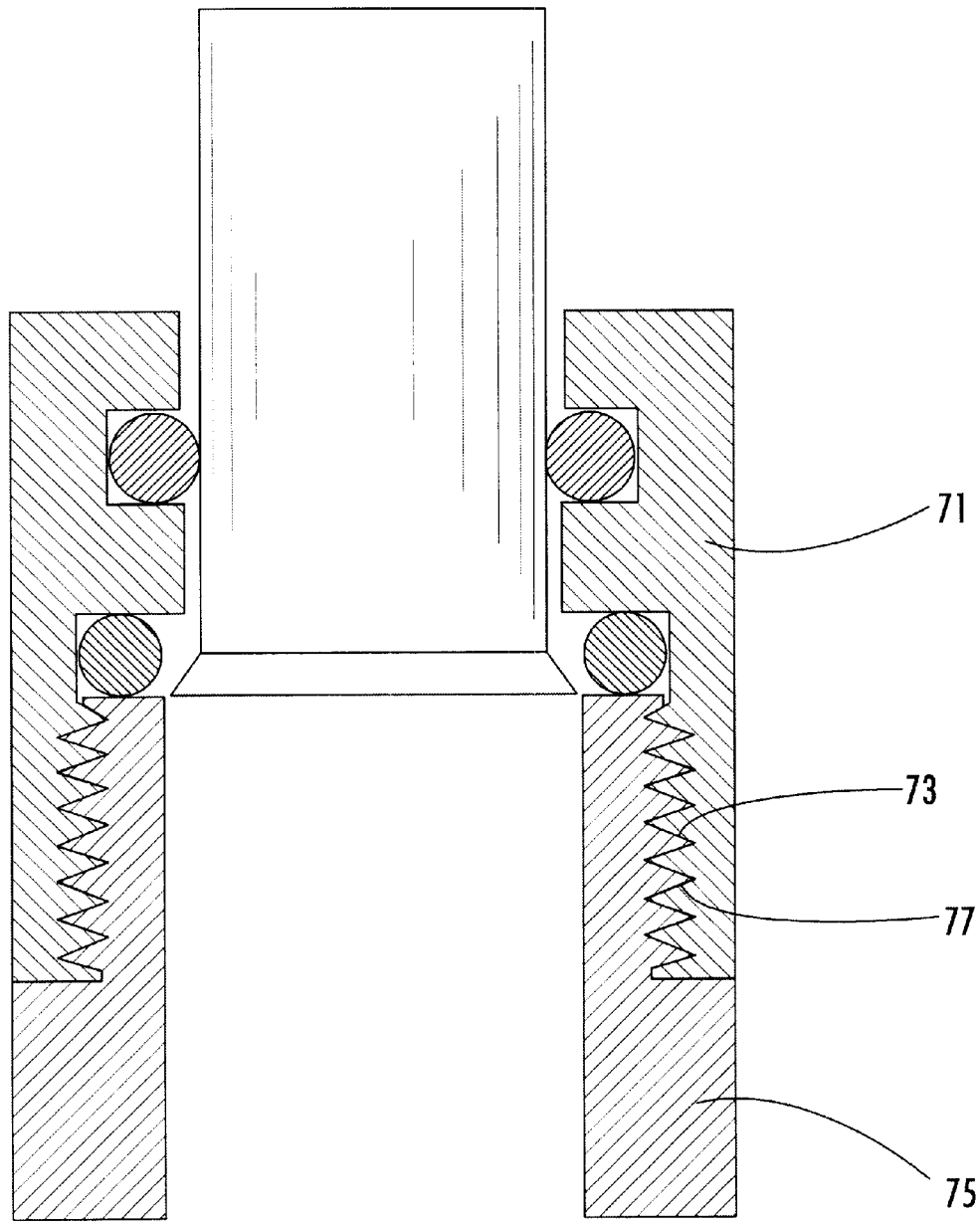
FIG. 3 shows a cross-section through a second embodiment of a joint of the invention.

Referring now to FIG. 3 of the accompanying drawings, a second embodiment of a joint in accordance with the present invention is similar to the embodiments shown in FIGS. 1 and 2, the main difference being that the annular sealing member 71 carries an internal threaded section 73. Tubular inlet 75 carries an outwardly facing threaded section 77 for engagement with section 73 of annular sealing member 71.

Figure 4:
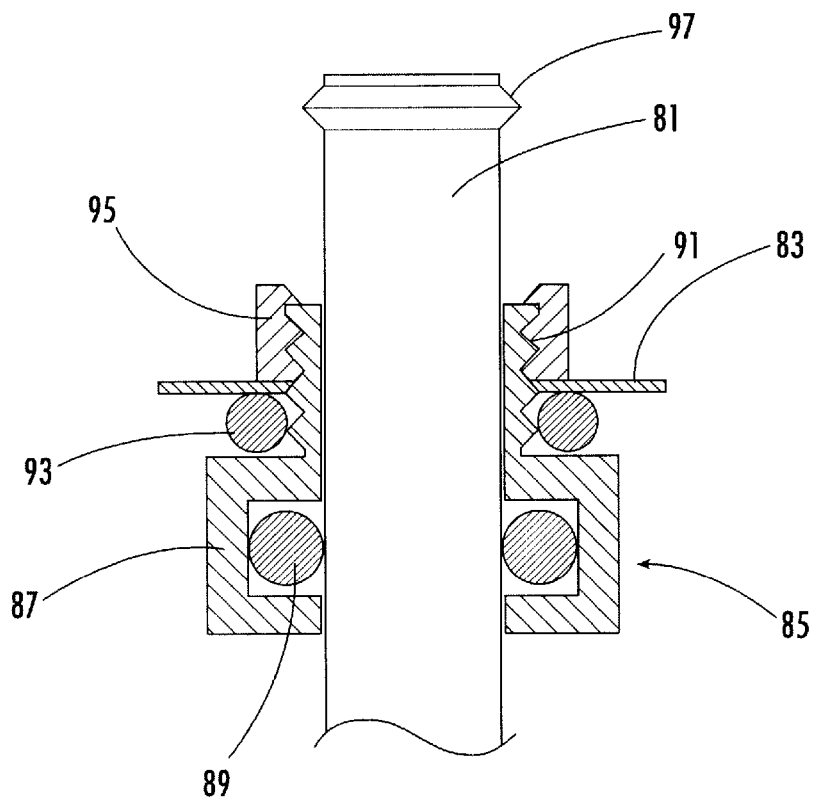
FIG. 4 shows a cross-section through a third embodiment of a joint of the invention.
Figure 5:
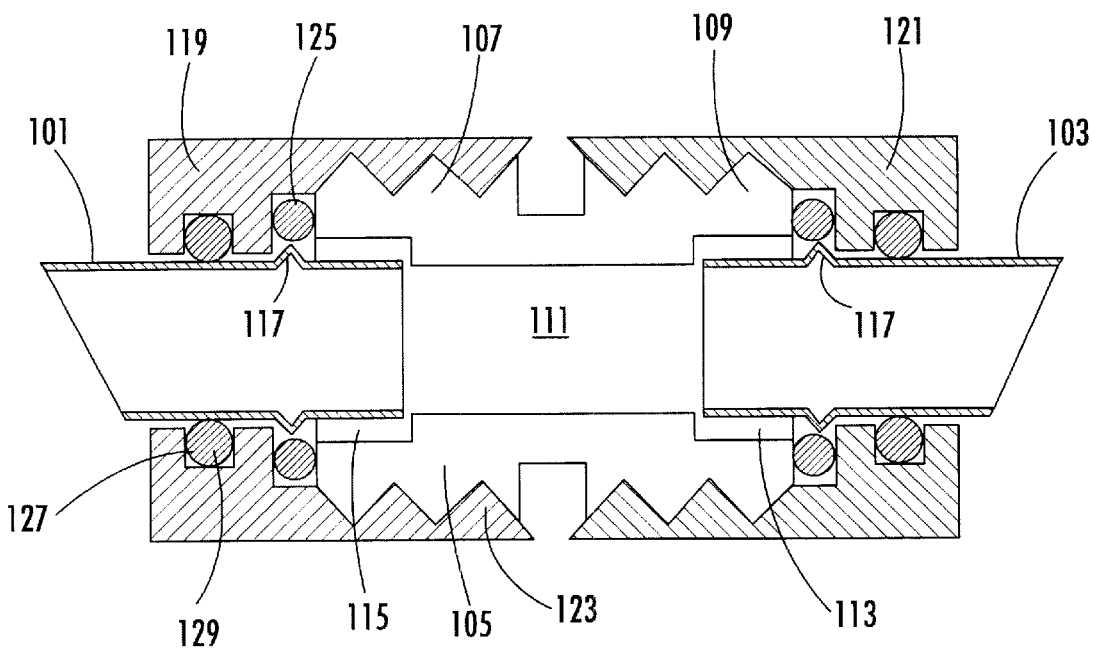
FIG. 5 shows a cross-section through a fourth embodiment of a joint of the invention.

Referring to FIG. 4 of the accompanying drawings, a third embodiment of a joint of the present invention is shown in use providing sealing of, for instance, an outlet pipe 81 into the wall 83 of a tank. In this case the annular sealing member 85 is in the form of a short tube of which a first portion 87 is shaped to provide an internal recess for accommodating an O-ring 89. Extending longitudinally from portion 87 is an externally threaded portion 91. As illustrated in FIG. 5, annular sealing member 85 surrounds pipe 81 with O-ring 89 in sealing engagement with the wall of pipe 81.

A further O-ring 93 is located around threaded portion 91 adjacent O-ring accommodating portion 87.

The joint is mounted into the tank wall with threaded portion 91 being in threaded engagement with a backing nut 95 welded to the rear of the tank wall 83 about the entry hole therein.

Pipe 81 is provided with an outwardly extending flange or crimped portion 97 which might be continuous or discontinuous around the periphery of the pipe. This portion 97 prevents the pipe from being pulled out of engagement with the joint. However subject to this limitation, axial movement between the pipe and the joint is possible.

An advantage of a tank joint as described above is that the inlet pipe may be fitted to the bottom of the tank and then pushed up into the tank to provide a clearance between the bottom of the tank and the end of the pipe of an appropriate amount, say of the order of 5 cm. With currently available arrangements, the inlet is provided in the side of the tank because no axial movement is possible between the pipe and the tank.

Referring to FIG. 5 of the accompanying drawings, there is illustrated a joint for interconnecting two pipes 101 and 103. The joint include a substantially tubular member 105 which has two externally threaded portions 107 and 109, longitudinally separated from each other. Internally tube 105 includes a central section 111 of relatively small diameter and stepped outwardly therefrom at each end thereof, pipe accommodating portions 113 and 115 of somewhat larger diameter.

As shown in FIG. 5, each pipe end 101 and 103 is provided with an outwardly directed flange 117 which extends about the periphery of the pipe end and is located a short distance from the very end of the pipe.

The joint is provided with a pair of annular sealing members 119, 121. Each annular sealing member is associated with a respective pipe end and each has an internally threaded section 123 for engagement with a respective threaded section of tube 107. Adjacent the threaded section is located an O-ring 125 which is for sealing between the end of the tube 107 and the annular sealing member 119 or 121.

Longitudinally adjacent O-ring 125 is an internally facing channel or recess 127 provided on the annular sealing member 119 or 121. Located within recess 127 is a further O-ring 129 providing sealing between the annular sealing member and the pipe.

Figure 6:
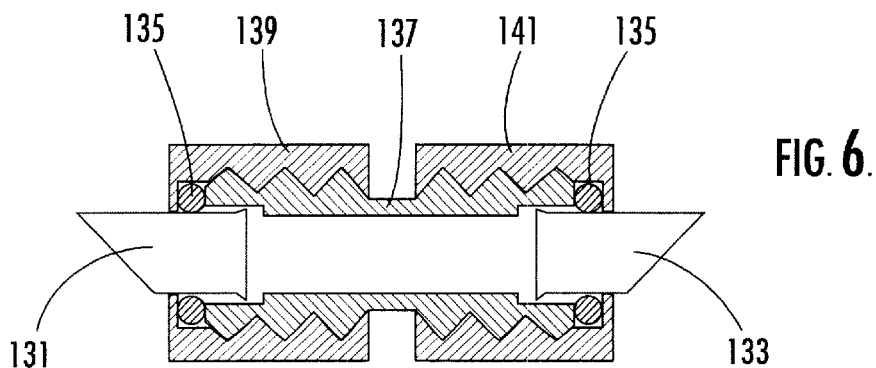
FIG. 6 shows a cross-section through a fifth embodiment of a joint of the present invention.

It can be seen that, with pipes 101 and 103 located in position, as shown in FIG. 6, within respective annular sealing members 107 and 109 and with the latter tightened on threaded tube 105, sealing is provided between the two pipe ends via the annular sealing members and the central tube.

Figure 7:
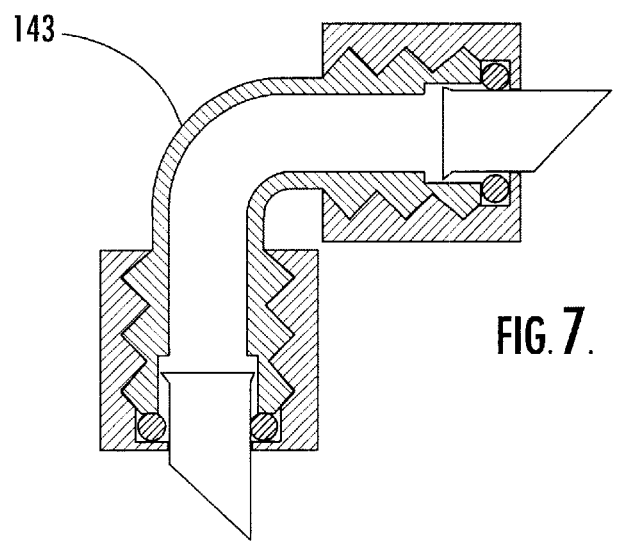
FIG. 7 shows a cross-section through a sixth embodiment of a joint of the invention.

Referring now to FIG. 6 of the accompanying drawings, a joint for connecting together two pipes 131, 135 is similar to that described in connection with FIG. 5 except that there is associated with each pipe end only a single sealing ring 135 which, as shown in FIG. 7, is, in use, squeezed between the pipe end, the central threaded tube 137 and the respective annular sealing member 139 or 141.

Referring to FIG. 7 of the accompanying drawings, a joint is shown for sealing between two pipes disposed at angles to each other, in this case at a right angle to each other. The essential difference between this joint and that of FIG. 7 is that the central tube 143 includes a right angle turn.

Figure 8:
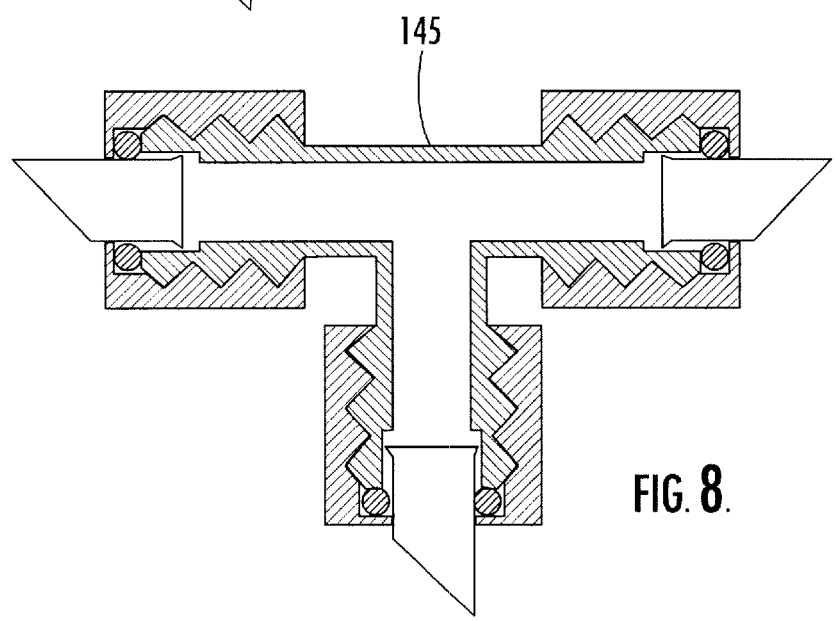
FIG. 8 shows a cross-section through a seventh embodiment of a joint of the invention.

Referring now to FIG. 8 of the accompanying drawings, there is here shown an arrangement similar to that of FIGS. 7 and 8 except that it is for use in connecting together three pipes and makes use of a T-junction central member 145 having three threaded ends, each said end for mating with a corresponding annular sealing member.

Figure 9:
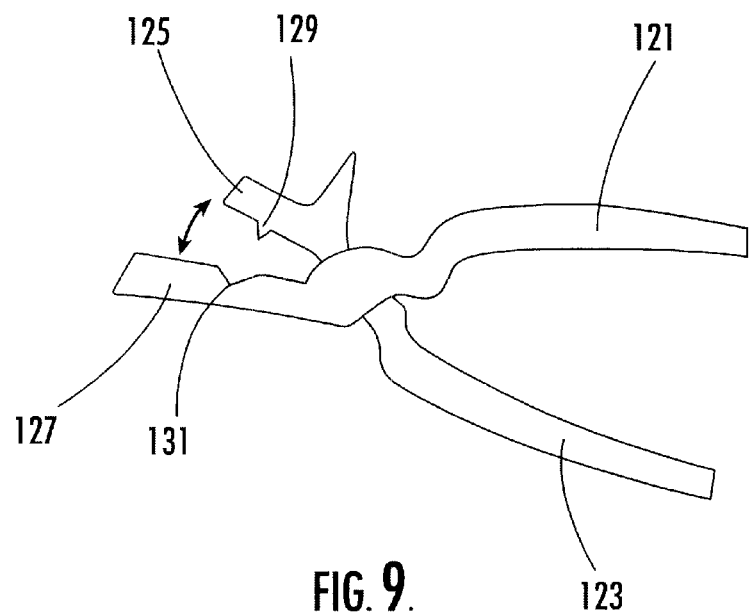
FIG. 9 shows a tool for distorting or crimping the end of a pipe for use with a joint of the present invention.

Referring to FIG. 9 of the accompanying drawings, there is depicted a simple tool for distorting or crimping the end of a pipe for use in connection with one of the above described joints of the present invention. The tool is a manual, scissor-action implement having handles 121 and 123 which are pivotally connected together and from which extend upper and lower jaws 125 and 127. Upper jaw 125 is provided with a downwardly extending spike or rib 129. Lower jaw 127 is provided with a corresponding recess 131 into which spike or rib 129 fits when the jaws of the implement are closed together.

With the pipe end placed between the jaws 125, 127 of the implement, the jaws may be manually caused to come together and pressure exerted on the handles of the implement will cause the spike or rib 129 to deform the pipe near its end to form an outwardly extending deformation on the pipe end. The deformation may be a single deformation, a series of peripherally spaced apart deformations or, by running the tool around the pipe end, a continuous peripheral distortion.

Figure 10:
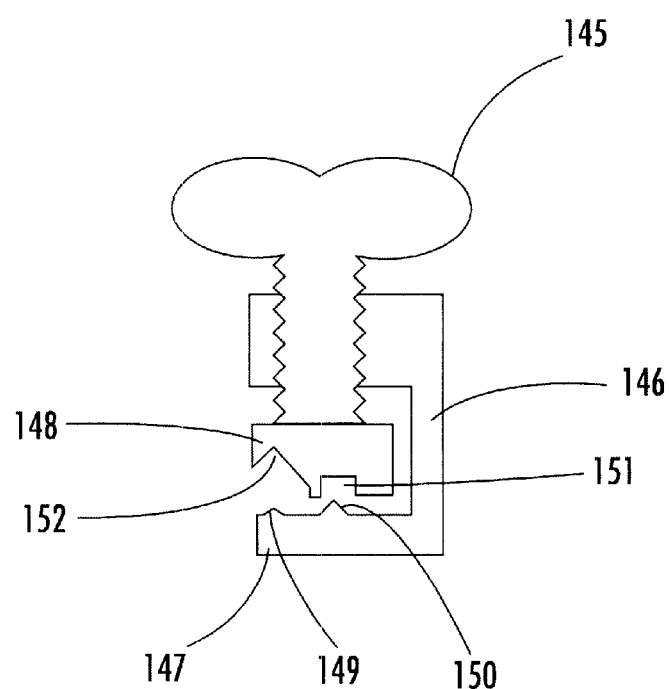
FIG. 10 shows an alternative embodiment of a tool for distorting or crimping the end of a pipe for use with a joint of the present invention.

With reference to FIG. 10 there is shown an alternative embodiment to the tool of FIG. 10. In this particular embodiment the tool 146 operates by a clamping mechanism, the force being applied by turning of screw threaded means 145. Lower clamping surface 147 is provided with protrusions 149 and 150 and upper clamping surface 148 is provided with corresponding recesses 151 and 152. Protrusion 150 is spiked so as to provide significant deformation to a pipe when clamped about a pipe, in order that a ridge of sufficient dimensions is formed that is capable of abutting the end of the annular sealing member and preventing disengagement of the joint. Protrusion 149 is of relatively smaller dimensions and is intended to provide the pipe with a relatively less prominent ridge or deformation following clamping about the pipe.

Figure 11:
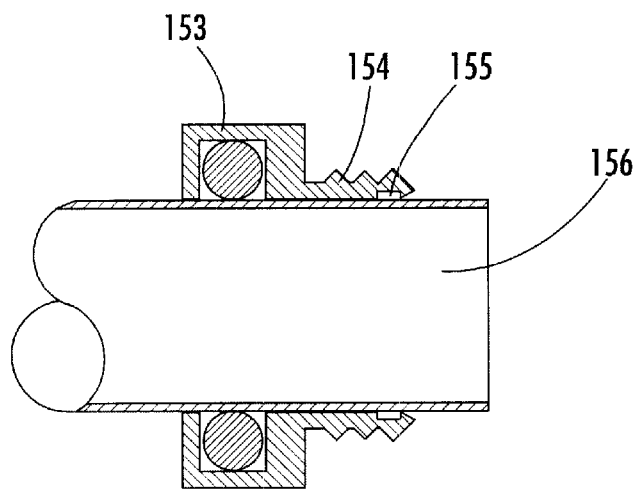
FIG. 11 shows a cross-section through a ninth embodiment of a joint of the invention.

Referring to FIG. 11 there is shown a ninth embodiment of a joint in accordance with the present invention, which is similar to the embodiments shown in FIGS. 4 and 5, in that the annular sealing member 153 carries an internal threaded section 154. The main difference being the provision of a recess portion 155, the recess portion is provided on the innermost surface of the annular sealing member, that surface being in contact with the pipe 156 and close to the end of the threaded section 154.

Figure 12:
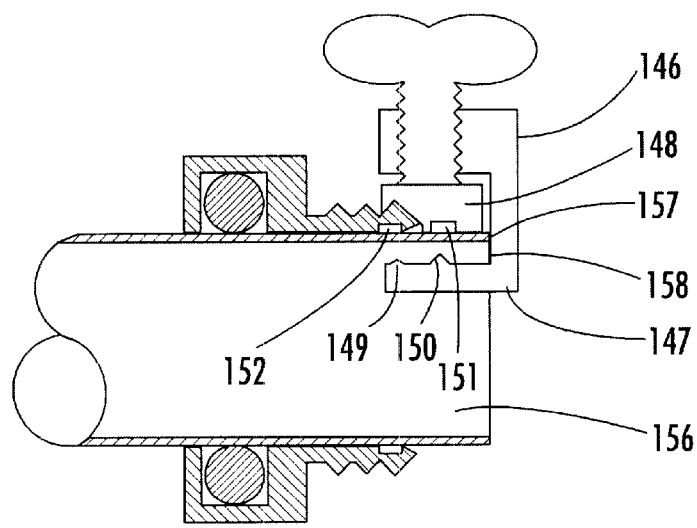
FIG. 12 shows the tool of FIG. 10 placed about the joint of FIG. 11 at the start of the procedure to distort or crimp the end of a pipe.
Figure 13:
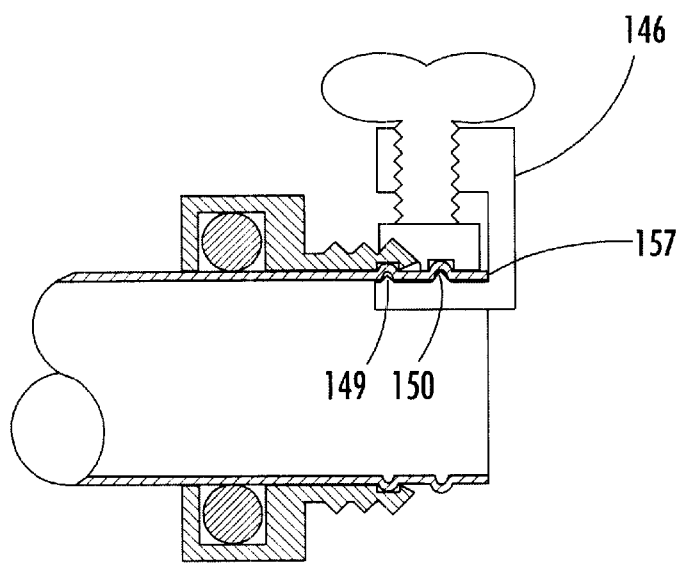
FIG. 13 shows progression of FIG. 12.

With reference to FIGS. 12 and 13, there is shown the tool 146 of FIG. 10, placed about the pipe and joint of FIG. 11 at a preliminary stage in the process of crimping or deforming or grooving the pipe 156. Upper clamping surface 148 is allowed to rest on the outer surface 157 of the pipe and is located by abutting the end of the pipe against an inner surface 158 of the tool. Once in position, clamping force is applied by turning the threaded screw means 145. The clamping force is continually applied (with reference to FIG. 13) until the two protrusions on the lower clamping surface are positioned in their corresponding recesses in the upper clamping surface thereby effectively sandwiching the pipe therebetween. As a result of the applied clamping force the pipe is appropriately deformed so that it has the first and second protrusions imparted thereon.

The joint and tool of the present invention therefore presents a novel and elegant means for connecting a pipe or other tubular element to a hollow structure such as a water tank or the like, having a tubular inlet thereto. It also provides a joint that is easy to install and provides some relative axial movement for ease of maintenance and the like whilst maintaining a strong and effective connection.

What is claimed is:

1. A method of interconnecting an end of a pipe with a hollow structure having a screw-threaded tubular inlet thereto, the method comprising:

applying a one-part annular sealing member around the pipe, said annular sealing member having a screw-threaded portion for engagement with the screw-threaded tubular inlet and being provided with first and second sealing means, said first sealing means being for sealing engagement between said annular sealing member and said inlet and second sealing means being for sealing engagement between said annular sealing member and said pipe end, and wherein axial movement of said pipe relative to said annular sealing member is permitted when said annular sealing member is in sealing engagement with said pipe end, distorting outwardly the end of the pipe around at least a portion of the periphery thereof, and effecting screw-threaded engagement between the annular sealing member and the tubular inlet, such that sealing engagement is effected between said annular sealing member and said pipe end over a plurality of relative axial positions therebetween.

2. A method according to claim 1 in which the annular sealing member is provided with a recess to accommodate the outwardly distorted portion of the pipe end.

3. A method according to claim 2 wherein the recess is substantially continuous about the periphery of the pipe.

4. A method according to claim 1 wherein one or both of the first and second sealing means is an O-ring.

5. A method according to claim 1 in which the annular sealing member and the tubular member are such that they may be put into seal engagement with each other over a plurality of discrete relative axial positions or over a continuous range of positions therebetween.

6. A method according to claim 1 in which the annular sealing member and the tubular member are such that they may be put into sealing engagement with each other over a continuous range of relative axial positions therebetween.

7. A method according to claim 1 in which the tubular pipe is provided with two longitudinally-spaced and radially and outwardly extending protrusions.

8. A method according to claim 1 wherein said first and second sealing means are provided by respective first and second sealing members.

9. A method according to claim 1 wherein said first and second sealing means are provided by a single sealing member.

\* \* \* \* \*

UNITED STATES PATENT AND TRADEMARK OFFICE
CERTIFICATE OF CORRECTION

PATENT NO. : 6,481,086 B1
DATED : November 19, 2002
INVENTOR(S) : Davidson

It is certified that error appears in the above-identified patent and that said Letters Patent is hereby corrected as shown below:

<u>Column 6,</u>
Line 48, should read -- may be put into sealing engagement with each other over a --

Signed and Sealed this

Ninth Day of December, 2003

JAMES E. ROGAN
*Director of the United States Patent and Trademark Office*